UNITED STATES PATENT OFFICE.

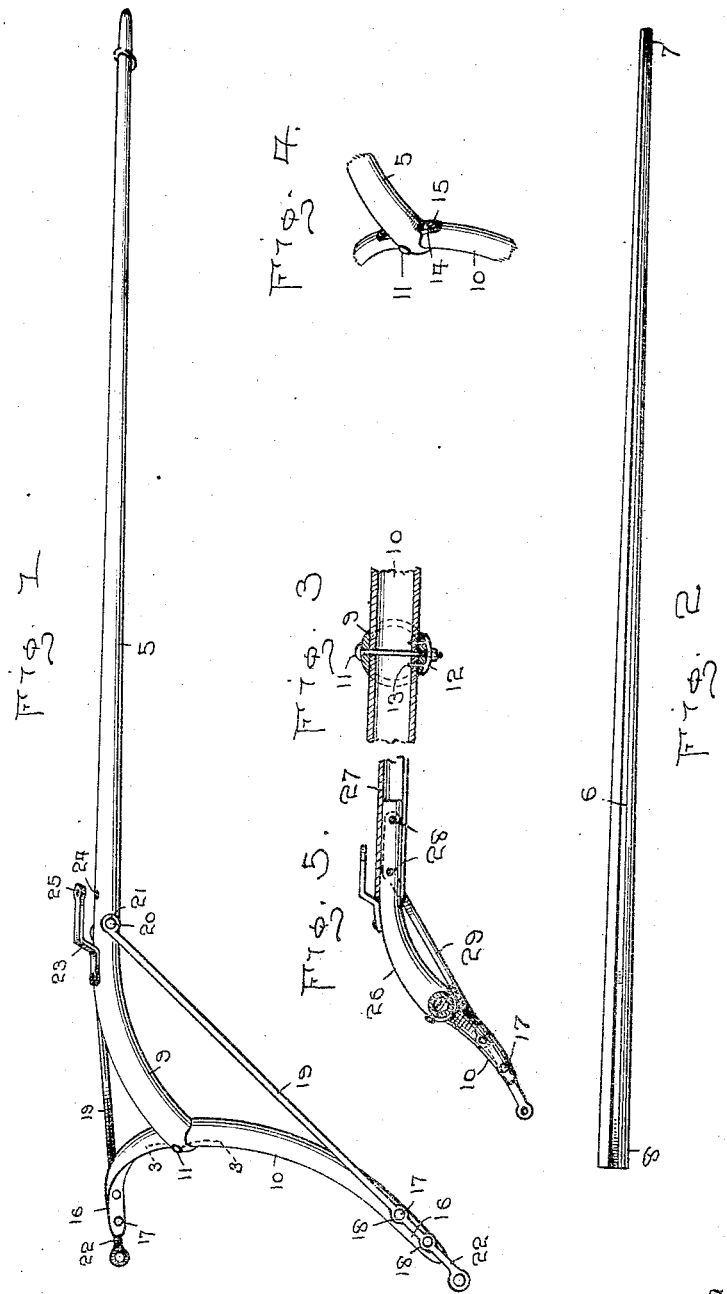

BENNIE P. HANSON AND LONE GRENARD, OF EAGLE GROVE, IOWA.

BUGGY-POLE.

1,114,756. Specification of Letters Patent. Patented Oct. 27, 1914.

Application filed November 13, 1913. Serial No. 800,821.

*To all whom it may concern:*

Be it known that we, BENNIE P. HANSON and LONE GRENARD, citizens of the United States, residing at Eagle Grove, in the county of Wright and State of Iowa, have invented certain new and useful Improvements in Buggy-Poles; and we do hereby declare the following to be a full, clear, and exact description of the invention, such as will enable others skilled in the art to which it appertains to make and use the same.

This invention relates to improvements in carriage and buggy poles, and one of the principal objects thereof, is to provide a carriage pole having an improved form of pole, and circle-bar, and improved means of connecting and bracing the same.

Another object of the invention is the provision of a pole of the class described, which is simple, comprises few parts, is very durable and strong, efficient in operation and inexpensive to manufacture.

With these, and other objects in view, the invention resides in the construction, combination and arrangement of parts, hereinafter more fully described and claimed, and illustrated in the accompanying drawing, in which like characters of reference indicate like parts throughout the several figures, of which, Figure 1 represents a perspective view of a carriage pole, constructed according to our invention. Fig. 2 represents a bottom plan view of the tube from which the pole proper is formed. Fig. 3 represents a vertical sectional view taken transversely of the pole on the line 3—3 of Fig. 1, Fig. 4 represents a fragmental perspective view of the rear end of the pole and adjacent part of the circle-bar, showing a modified means of securing the pole to the bar. Fig. 5 represents a vertical longitudinal view through the rear end of a modified form of tongue.

Referring more particularly to the drawing, 5 represents the pole proper, which is formed from a metal tube illustrated in bottom plan in Fig. 2, which tube is provided throughout its length on the under side thereof with a slot 6, and the tube is tapered from the forward end 7 to the rear end 8 thereof. In forming a pole, the tube is bent downwardly at its rear end as at 9 and is provided at its rear end with a transverse opening through which the hollow tubular circle-bar 10 extends, said circle-bar being secured to the pole by means of a bolt 11 extending through the upper side of the pole, through the bar and through the slot in the lower part of the pole, and finally through the body portion of the clip 12 which is substantially arcuate in formation, and which is provided with a pair of lugs 13 extending through openings in the lower side of the tube on each side of the slot and also through openings in the lower side of the circle-bar 10 so that pole and bar are very strongly fastened together. In Fig. 4, we have shown a modified means of connecting the pole and bar, said means comprising the provision of lugs or ears 14 formed near the rear end of pole 5 and which extend from both sides of said pole and are secured by means of bolts or rivets 15 to the circle-bar 10. The opposite ends of the circle-bar are flattened as at 16, and rivets or bolts 17 extend through said flattened ends and through eyes formed in brace rods 19 intermediate the ends thereof, for securing said brace rods to the circle-bar, the upper ends of the rods converging and being secured to the pole 5 by means of a bolt or other fastening means 20 passing through eyes 21 formed at the upper end of said rods and through said pole. The lower ends 22 of the brace rods extend rearwardly of the circle-bar, and form shackle irons by means of which the pole is shackled in the usual manner to the axle of a vehicle. A clip 23 is secured to the pole 5 rearwardly of the upper ends of brace rods 19, and the pole is provided with an opening 24 in alinement with the eye 25 of the clip, for securing the bolt, whereby a double tree may be secured on the pole. A very strong and substantial carriage pole is provided by this construction and by reason of the pole proper being slotted the same is rendered springy.

In the modification shown in Fig. 5, the pole is made in two sections, a hollow rear section 26, secured to circle-bar 10 in a manner as previously described, and a front section 27, formed like pole 5, but not curved downwardly at its rear end, said end being fitted telescopically over the front end of rear section 26, and secured in place thereon by means of a pair of bolts 28 which pass through the front end of brace rods similar to rods 19.

Although we have described the preferred embodiment of our invention, we may desire to make such changes in the construction, combination and arrangement of parts thereof, as do not depart from the spirit of the invention and the scope of the appended claim.

Having thus fully described our invention what we claim as new and desire to secure by Letters Patent is:

A vehicle pole comprising a spring tube having a longitudinal slot of increasing proportions and with an aperture in the rear end with bolt holes leading thereto, a circle-bar inserted in said aperture, registering clip-holes in said circle-bar and said tube, a clip inserted in said clip-holes to lock said circle-bar and tube from play, and a locking bolt inserted through the bolt-holes, the circle-bar and the clip to lock said devices into assembled position.

In testimony whereof we have signed our names to this specification in the presence of two subscribing witnesses.

BENNIE P. HANSON.
LONE GRENARD.

Witnesses:
GEORGE L. LOVELL,
R. C. STIRTON.

Copies of this patent may be obtained for five cents each, by addressing the "Commissioner of Patents, Washington, D. C."